United States Patent
Molchanov et al.

(10) Patent No.: US 7,225,437 B2
(45) Date of Patent: May 29, 2007

(54) DYNAMIC DISTRIBUTED MAKE

(75) Inventors: Nikolay Molchanov, Fremont, CA (US); Raj Prakash, Saratoga, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 683 days.

(21) Appl. No.: 10/400,224

(22) Filed: Mar. 26, 2003

(65) Prior Publication Data
US 2004/0194075 A1 Sep. 30, 2004

(51) Int. Cl.
G06F 9/44 (2006.01)
G06F 9/46 (2006.01)
(52) U.S. Cl. .................................. 717/145; 718/104
(58) Field of Classification Search ............... 717/149, 717/145; 718/104–106
See application file for complete search history.

(56) References Cited

U.S. PATENT DOCUMENTS

| | | | |
|---|---|---|---|
| 5,442,791 A | 8/1995 | Wrabetz et al. | 395/650 |
| 5,459,837 A | 10/1995 | Caccavale | 395/184.01 |
| 6,195,676 B1 | 2/2001 | Spix et al. | 709/107 |
| 6,418,460 B1 * | 7/2002 | Bitar et al. | 718/108 |
| 6,842,894 B1 * | 1/2005 | Havemose | 717/148 |
| 2002/0147855 A1 * | 10/2002 | Lu | 709/310 |

FOREIGN PATENT DOCUMENTS

EP 0 794 490 9/1997

OTHER PUBLICATIONS

Verghese et al., "Performance Isolation: Sharing and Isolation in Shared-Memory Multiprocessors", Oct. 1998, ACM SIGPLAN Notices, ACM SIGOPS Operating Systems Review, Proceedings of the eighth international conference on Architectural support for programming languages and operating systems ASPLOS-VIII, vol. 33 , 32 Issue 11 , 5 p. 181-192.*
Erik H. Baalbergen, "Design and Implementation of Parallel Make", 1988, http://citeseer.ist.psu.edu/erik88design.html.*

* cited by examiner

*Primary Examiner*—Wei Zhen
*Assistant Examiner*—Philip Wang
(74) *Attorney, Agent, or Firm*—Gunnison, McKay & Hodgson, L.L.P.; Forrest Gunnison

(57) ABSTRACT

A distributed make command is used when compiling a computer program in order to allow non-dependent processes in the compiling be performed in parallel, such as with different resources, in order to speed compile time. The distributed make command is typically executed by a user who also specifies a maximum number of resources to allocate to the compiling. The present invention dynamically adjusts this maximum number of resources to allocate if the resources become overloaded during the compiling, which has the effect of optimizing the efficiency of the compiling, either by reducing the number of resources utilized or by reducing the amount of time the compiling takes (or both).

29 Claims, 12 Drawing Sheets

DYNAMIC DISTRIBUTED MAKE

FIELD OF THE INVENTION

The present invention relates to the field of computer software compiling. More particularly, the present invention relates to a dynamic distributed make for computer software compiling.

BACKGROUND OF THE INVENTION

When a computer program is built, the code is typically written in a high level language, such as C++. The code is typically placed in one or more source files. Upon compiling, these source files may be made into object files, and combined with other object files to create the final software.

Make is a software tool that automates the procedures required to compile a program. The interdependencies between different source files may be stored in a makefile, which enables Make to recompile only those files that have been changed. A typical makefile may read as follows:

```
x1.o:
     cc -c x1.c
x2.o:
     cc -c x2.c
a.out: x1.o x2.o
     ld -o a.out x1.o x2.o
```

This indicates that object file x1.o is made by compiling x1.c, x2.o is made by compiling x2.c, and a.out is made by linking x1.o and x2.o.

Make operates sequentially, as due to the dependencies certain actions must be done before other actions. However, there are some situations where actions could be done simultaneously (if they are not dependent on one another). Make does not provide for any facility to take advantage of this fact. Distributed Make (Dmake) was therefore created to allow non-dependent actions to be executed in parallel, such as on different systems, to speed compile time.

The Dmake command includes a parameter indicating a maximum number of resources to utilize. This is often used because it is can be beneficial to leave resources for other people.

The problem with this maximum parameter is that it can often be set too high for optimal compiling. This occurs if, for example, the programmer overestimates the amount of resources available or unexpected jobs begin utilizing resources.

This problem may be illustrated through the use of several examples. In each of these examples, Dmake starts 64 parallel jobs, with each job taking 256 MB of memory and 60 seconds of CPU time. FIG. 1 is a graph illustrating an example of the build operation in a system having 64 CPUs and more than 16 GB of memory. This is a case where there are plenty of resources, and thus the program compiles quickly, in about 60 seconds.

FIG. 2 is a graph illustrating an example of the build operation in a system having 4 CPUs and more than 16 GB of memory. Here, there are a moderate amount of resources, and thus the program still compiles in a reasonable time, about 20 minutes, although not as fast as the example in FIG. 1.

FIG. 3 is a graph illustrating an example of the build operation in a system having 4 CPUs and less than 16 GB of memory. Here, the build will take a very long time because when the memory limit is exceeded, swapping must occur (indicated by area 300). The overall parallel system runs very inefficiently whenever swapping must occur.

Thus, the maximum parameter specified by the programmer may result in an oversubscription of the system, resulting in a less than ideal throughput. What is needed is a solution that achieves the optimum throughput on the system.

BRIEF DESCRIPTION

A distributed make command is used when compiling a computer program in order to allow non-dependent processes in the compiling be performed in parallel, such as with different resources, in order to speed compile time. The distributed make command is typically executed by a user who also specifies a maximum number of resources to allocate to the compiling. The present invention dynamically adjusts this maximum number of resources to allocate if the resources become overloaded during the compiling, which has the effect of optimizing the efficiency of the compiling, either by reducing the number of resources utilized or by reducing the amount of time the compiling takes (or both).

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention In the drawings.

DETAILED DESCRIPTION

Figure 1:
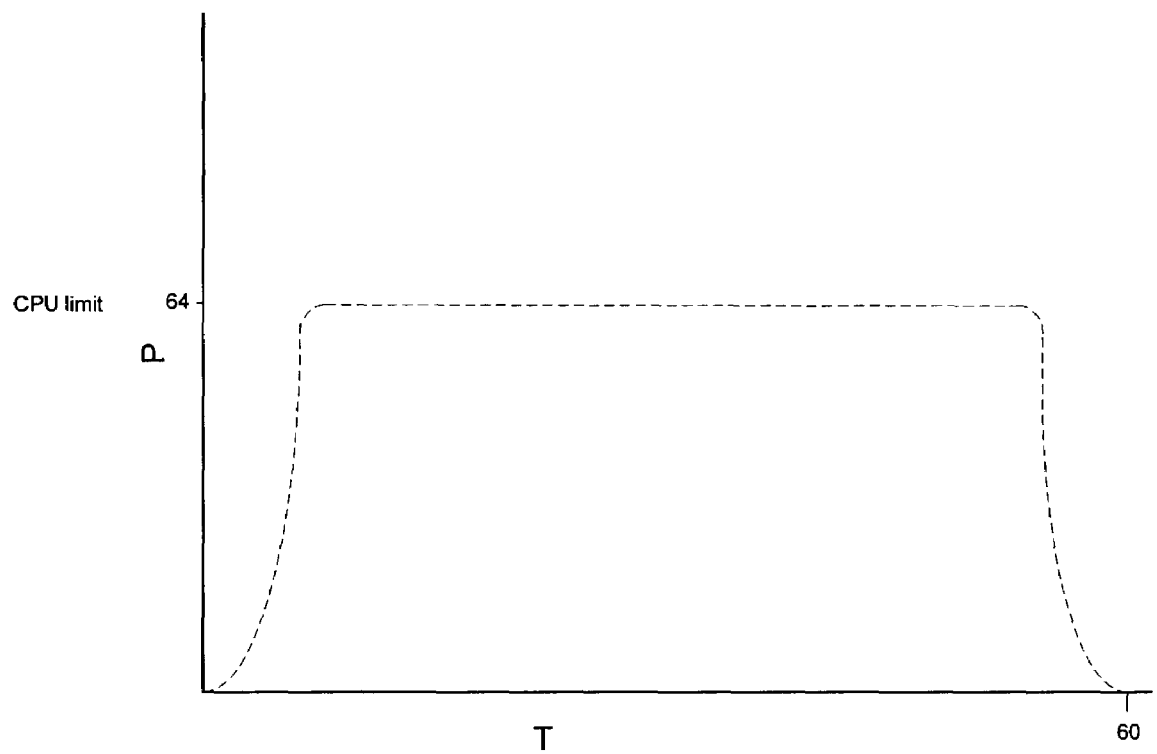
FIG. 1 is a graph illustrating an example of the build operation in a system having 64 CPUs and more than 16 GB of memory.

Embodiments of the present invention are described herein in the context of a system of computers, servers, and software. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with the present invention, the components, process steps, and/or data structures may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

The present invention achieves optimal throughout on a parallel computing system by providing a mechanism to dynamically adjust the number of parallel processes that are spawned based on available resources. The maximum parameter specified by the programmer may be modified as the compile is occurring. If the system is not overloaded, Dmake may continue to spawn new parallel processes while keeping track of the load on the system. When the system becomes sufficiently busy, dmake may set the limit of the allowed parallel jobs to a lower value.

Thus, in one embodiment of the present invention, the adjusted limit of processes (N) may be set equal to the maximum limit set by the programmer (L) minus a function involving the total number of active processes in the operating system (Q) over the number of CPUs (C). Thus, $N=L-func(Q/C)$, or to cover the case where it may need to be returned back to the original limit when resources are no longer overloaded, $N=MAX (1, L-func (Q/C))$.

In another embodiment of the present invention, the adjusted limit of processes may be set via a more specific function, such as $N=MAX (1, L-Q/C)$.

These embodiments should not be read as limiting, as the functions may be set as appropriate for the particular system and type of resources involved. For example, there is no requirement that the number of available CPUs be utilized as the sole measure of available resources—other factors may be utilized as well. Additionally, it may be beneficial in certain instances to wait to apply the function until the system is significantly overloaded. Thus, in the embodiments described above, rather than adjusting the limit as soon as Q exceeds C, it may be more beneficial to wait until Q exceeds C by 200 or 300 percent.

While this solution can reduce the total amount of compiling time required for a project, it is also beneficial in that it can often reduce the number of resources utilized while not impacting the total compiling time. The following examples may be utilized to illustrate this.

Figure 4:
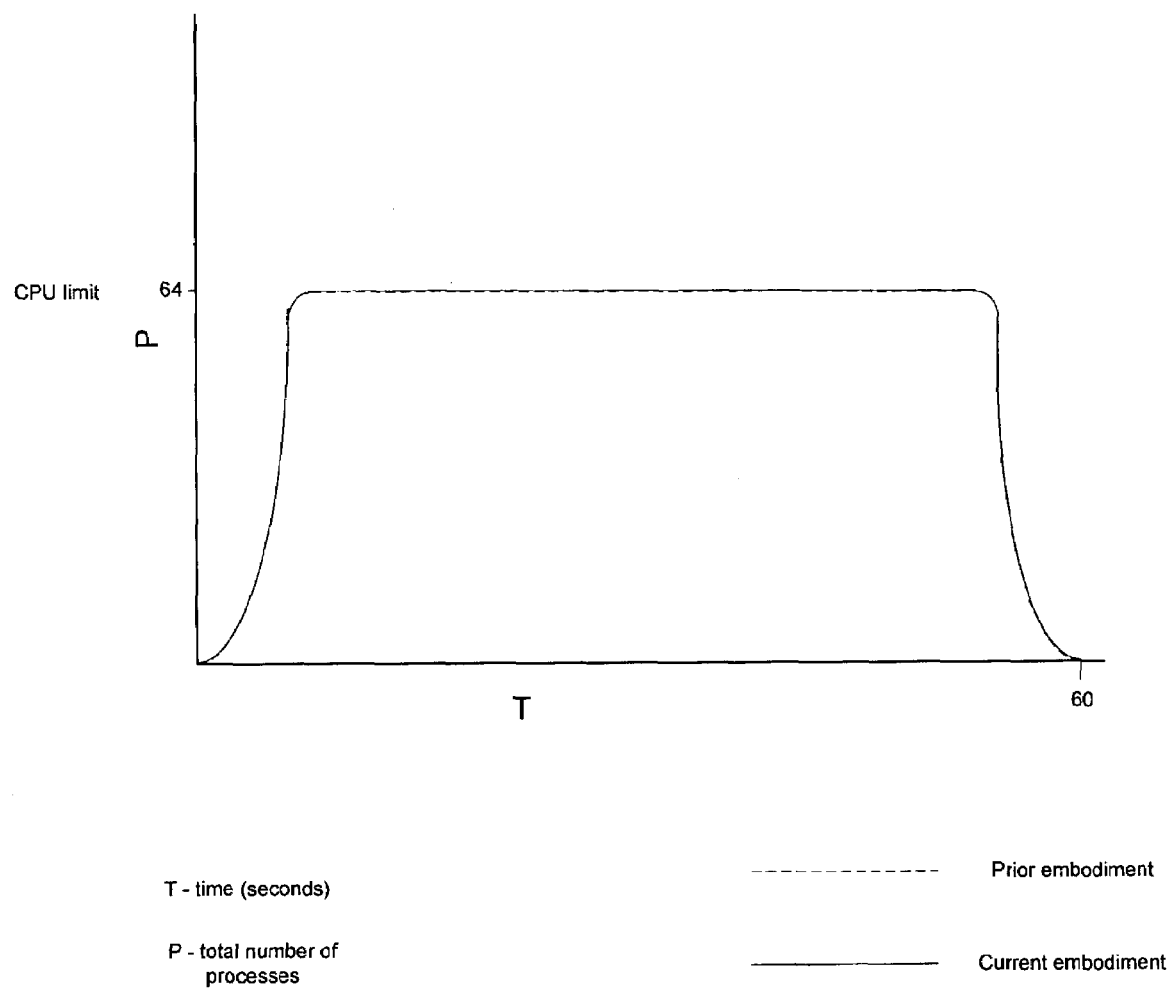
FIG. 4 is a graph illustrating an example of the build operation in a system having 64 CPUs and more than 16 GB of memory in accordance with an embodiment of the present invention.

FIG. 4 is a graph illustrating an example of the build operation in a system having 64 CPUs and more than 16 GB of memory in accordance with an embodiment of the present invention. This is a case like FIG. 1 where there are plenty of resources, and thus the program compiles quickly, in about 60 seconds. Thus, while there is no advantage in this example to using an embodiment of the present invention, there is no disadvantage either.

Figure 2:
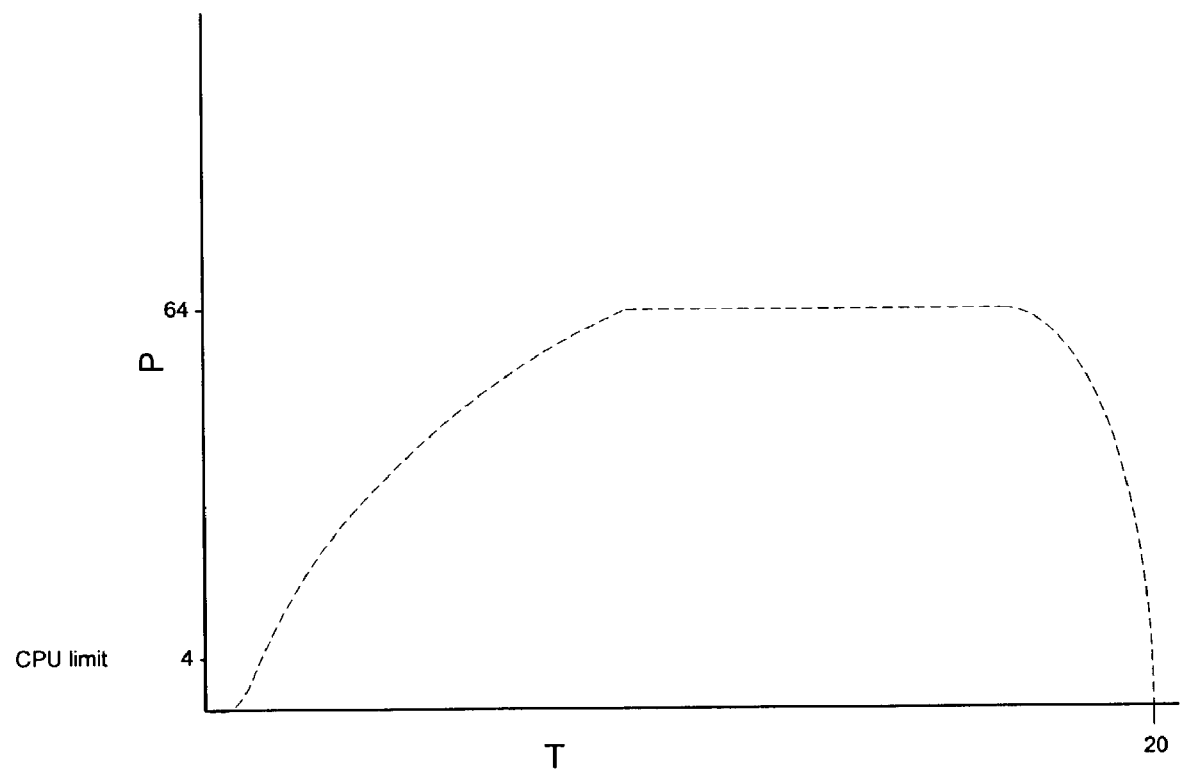
FIG. 2 is a graph illustrating an example of the build operation in a system having 4 CPUs and more than 16 GB of memory.
Figure 5:
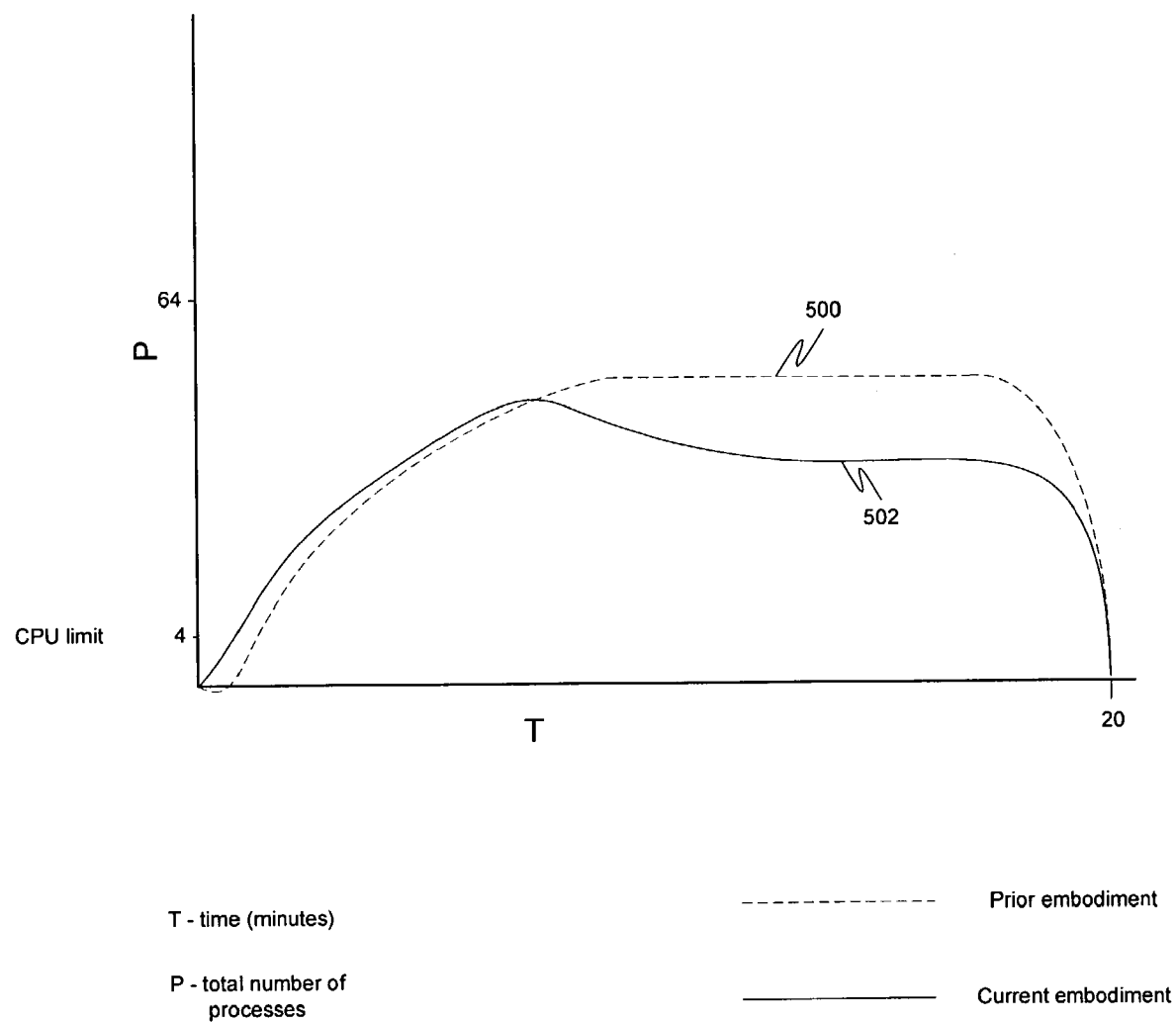
FIG. 5 is a graph illustrating an example of the build operation in a system having 4 CPUs and more than 16 GB of memory in accordance with an embodiment of the present invention.

FIG. 5 is a graph illustrating an example of the build operation in a system having 4 CPUs and more than 16 GB of memory in accordance with an embodiment of the present invention. Here, there are a moderate amount of resources, similar to FIG. 2, and the results from FIG. 2 are illustrated by line 500. Line 502, however, indicates the results using an embodiment of the present invention. As can be seen, the compiling still takes 20 minutes, but the number of resources utilized is much improved over the example in FIG. 2.

Figure 3:
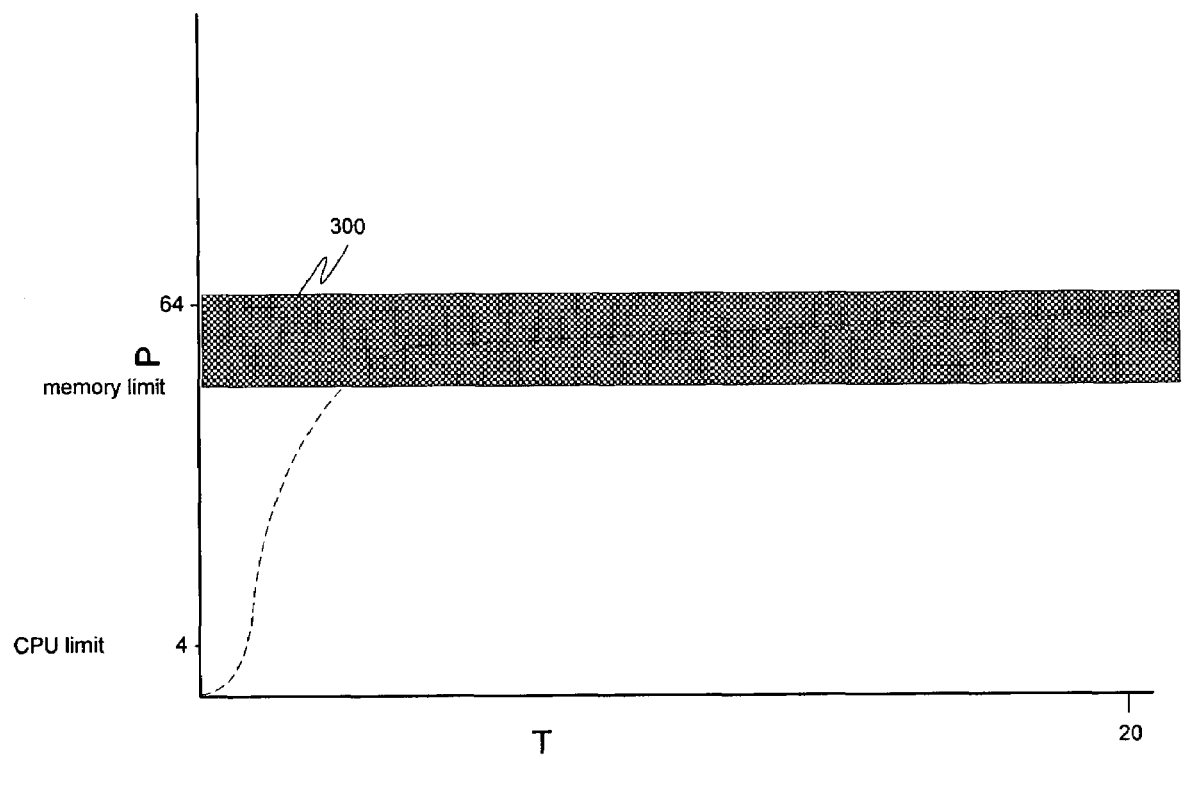
FIG. 3 is a graph illustrating an example of the build operation in a system having 4 CPUs and less than 16 GB of memory.
Figure 6:
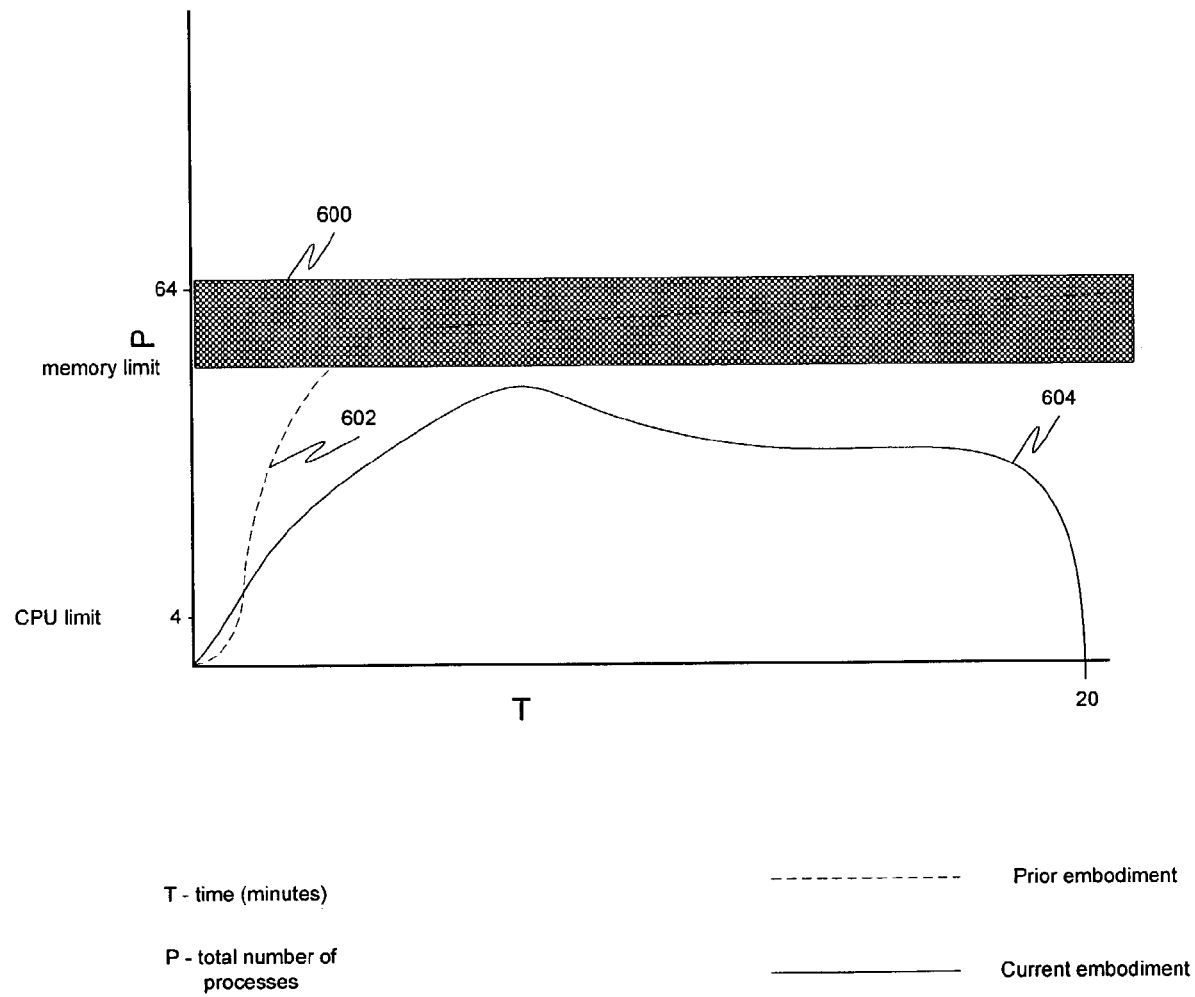
FIG. 6 is a graph illustrating an example of the build operation in a system having 4 CPUs and less than 16 GB of memory in accordance with an embodiment of the present invention.

FIG. 6 is a graph illustrating an example of the build operation in a system having 4 CUPs and less than 16 GB of memory in accordance with an embodiment of the present invention. Area 600 indicates a region where swapping must occur because of a memory overloading problem. Here, the results from FIG. 3 are illustrated by line 602. Line 604, however, indicates the results using an embodiment of the present invention. As can be seen, the embodiment of the present invention avoids overloading the memory, resulting in both fewer resources being utilized and the compiling occurring in a reasonable time (20 minutes).

Figure 7:
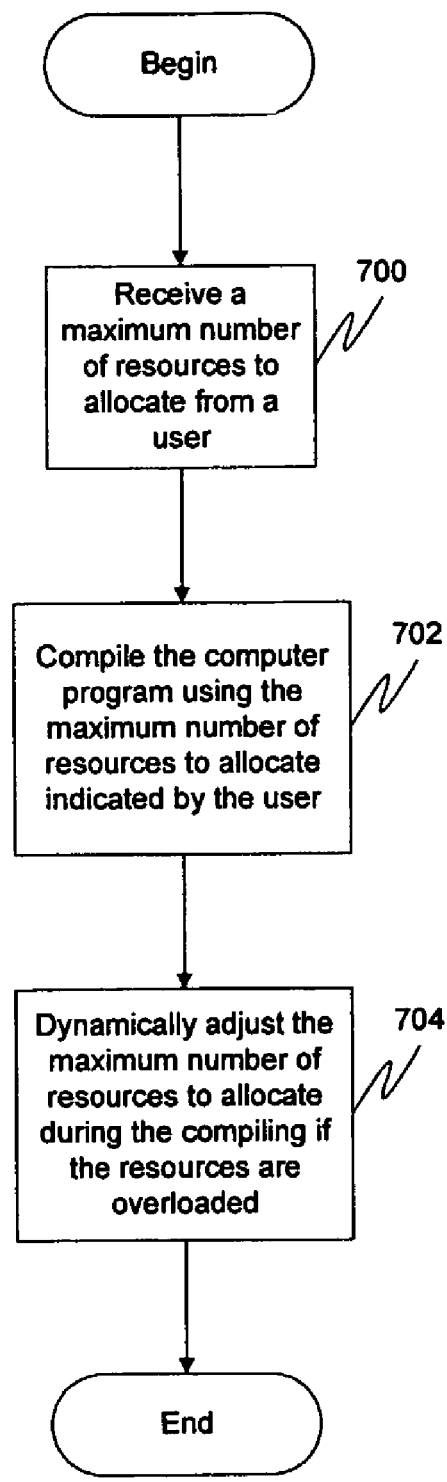
FIG. 7 is a flow diagram illustrating a method for optimizing resource utilized in a compiling a computer program in accordance with an embodiment of the present invention.

FIG. 7 is a flow diagram illustrating a method for optimizing resource utilized in a compiling a computer program in accordance with an embodiment of the present invention. At 700, a maximum number of resources to allocate may be received from a user. At 702, the computer program may be compiled using the maximum number of resources to allocate indicated by the user. At 704, the maximum number of resources to allocate may be dynamically adjusted during the compiling if the resources are overloaded. Dynamically adjusting may comprise, for example, lowering the maximum number of resources by a function of the number of active processes divided by the number of resources. It may also comprise, for example, setting the maximum number of resources equal to the maximum of either one or a value equal to the maximum number of resources to allocate indicated by the user minus a function of the number of active processes divided by the number of resources. The resources may be considered overloaded if, for example, the number of active processes exceeds the number of active resources, exceeds it by at least 200%, or exceeds it by at least 300%.

Figure 8:
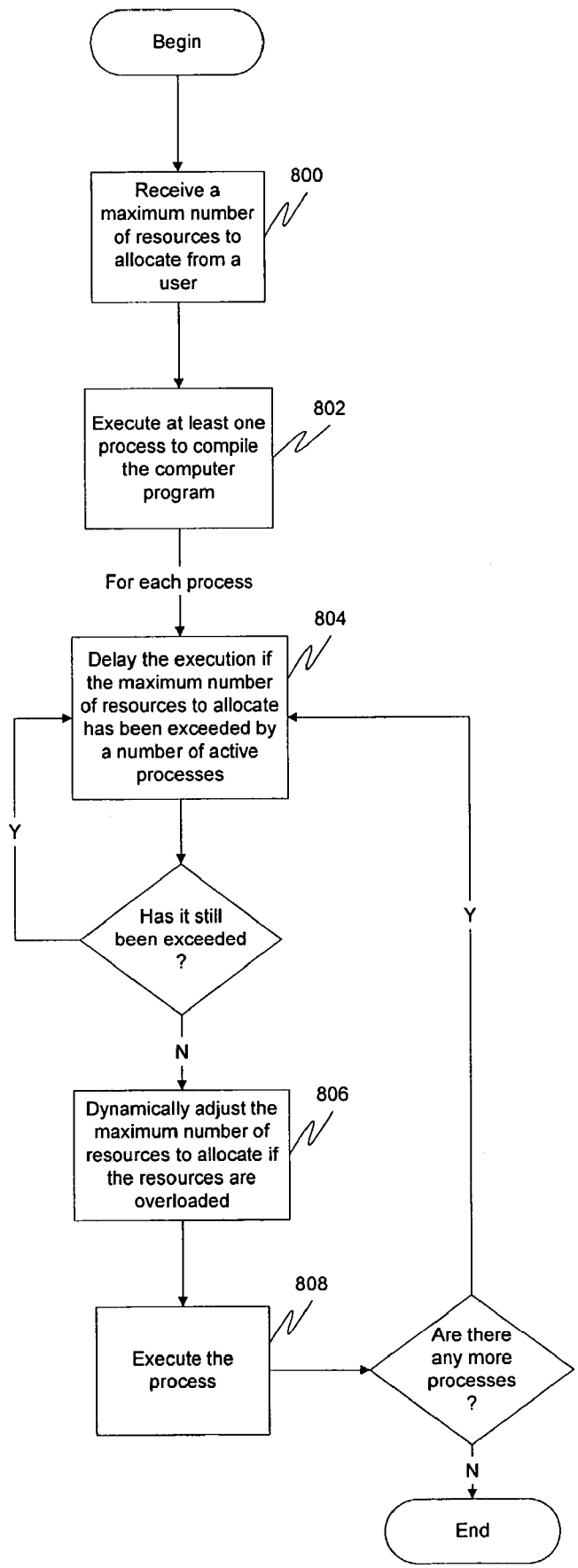
FIG. 8 is a flow diagram illustrating a method for optimizing resource utilized in a compiling a computer program in accordance with another embodiment of the present invention.

FIG. 8 is a flow diagram illustrating a method for optimizing resource utilized in a compiling a computer program in accordance with another embodiment of the present invention. At 800, a maximum number of resources to allocate may be received from a user. At 802, at least one process may be executed to compile the computer program. For each process, the execution may be delayed at 804 if the maximum number of resources to allocate has been exceeded by a number of active processes. At 806, the maximum number of resources to allocate may be dynamically adjusted if the resources are overloaded. Dynamically adjusting may comprise, for example, lowering the maximum number of resources by a function of the number of active processes divided by the number of resources. It may also comprise, for example, setting the maximum number of resources equal to the maximum of either one or a value equal to the maximum number of resources to allocate indicated by the user minus a function of the number of active processes divided by the number of resources. The resources may be considered overloaded if, for example, the number of active processes exceeds the number of active resources, exceeds it by at least 200%, or exceeds it by at least 300%. At 808, the process may be executed.

Figure 9:
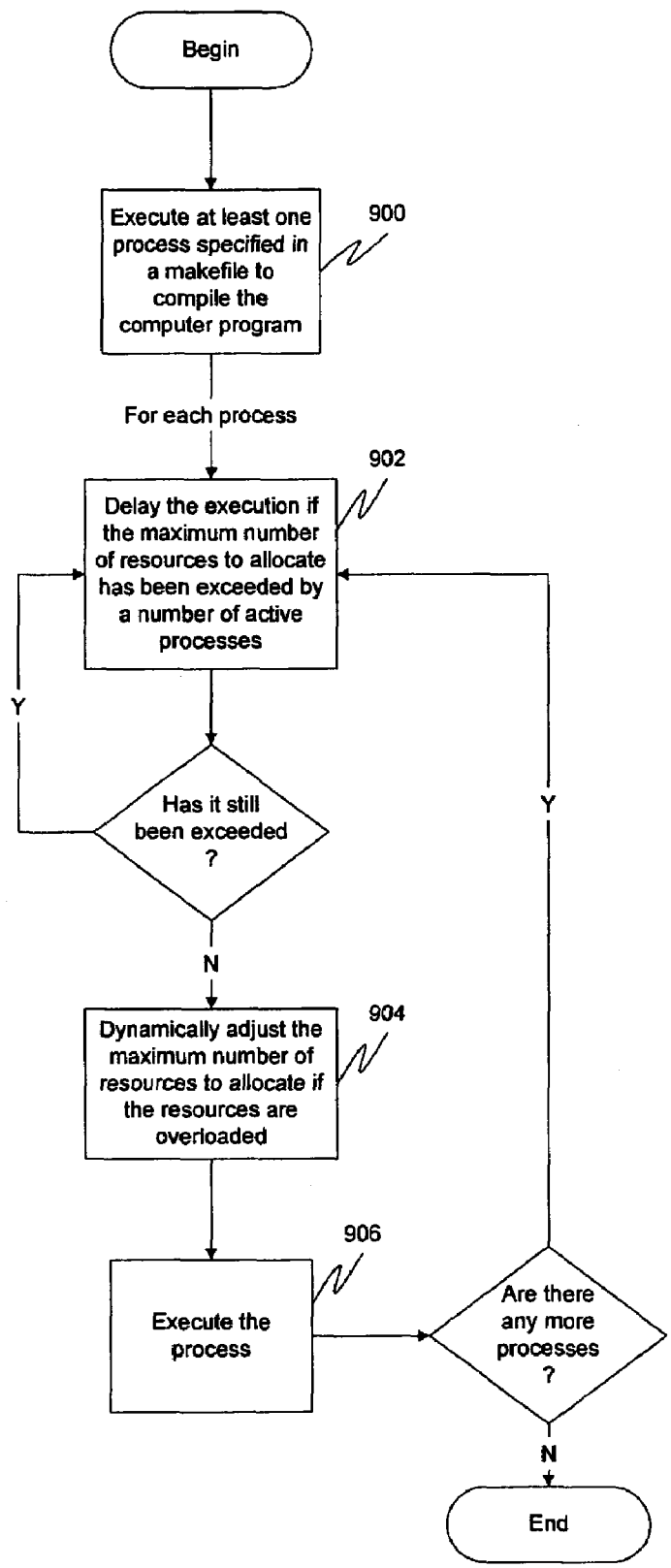
FIG. 9 is a flow diagram illustrating a method for executing a distributed make command having a maximum number of resources to allocate as a parameter in accordance with an of the present invention.
Figure 10:
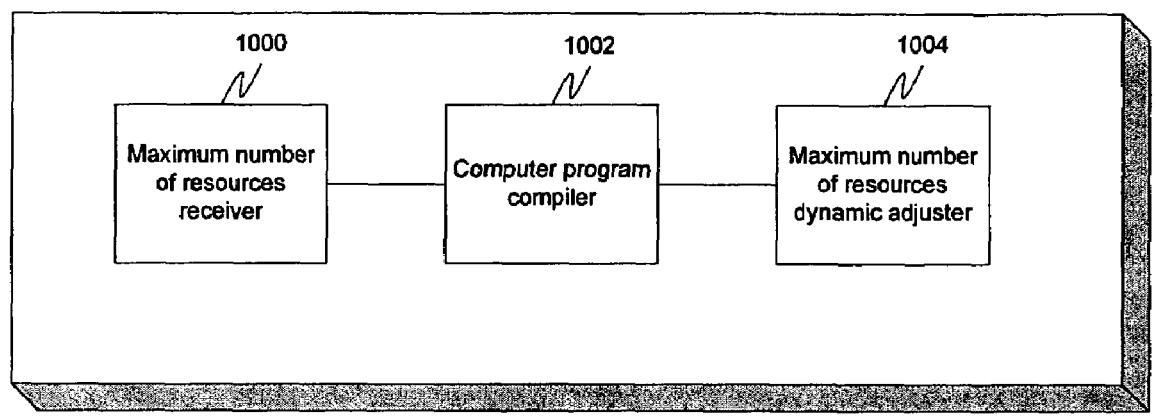
FIG. 10 is a block diagram illustrating an apparatus for optimizing resource utilized in a compiling a computer program in accordance with an embodiment of the present invention.

FIG. 9 is a flow diagram illustrating a method for executing a distributed make command having a maximum number of resources to allocate as a parameter in accordance with an of the present invention. At 900, at least one process specified in a makefile may be executed to compile the computer program. For each process, the execution may be delayed at 902 if the maximum number of resources to allocate has been exceeded by a number of active processes. At 904, the maximum number of resources to allocate may be dynamically adjusted if the resources are overloaded. Dynamically adjusting may comprise, for example, lowering the maximum number of resources by a function of the number of active processes divided by the number of resources. It may also comprise, for example, setting the maximum number of resources equal to the maximum of either one or a value equal to the maximum number of resources to allocate indicated by the user minus a function of the number of active processes divided by the number of resources. The resources may be considered overloaded if, for example, the number of active processes exceeds the number of active resources, exceeds it by at least 200%, or exceeds it by at least 300%. At 906, the process may be executed.

Figure 11:
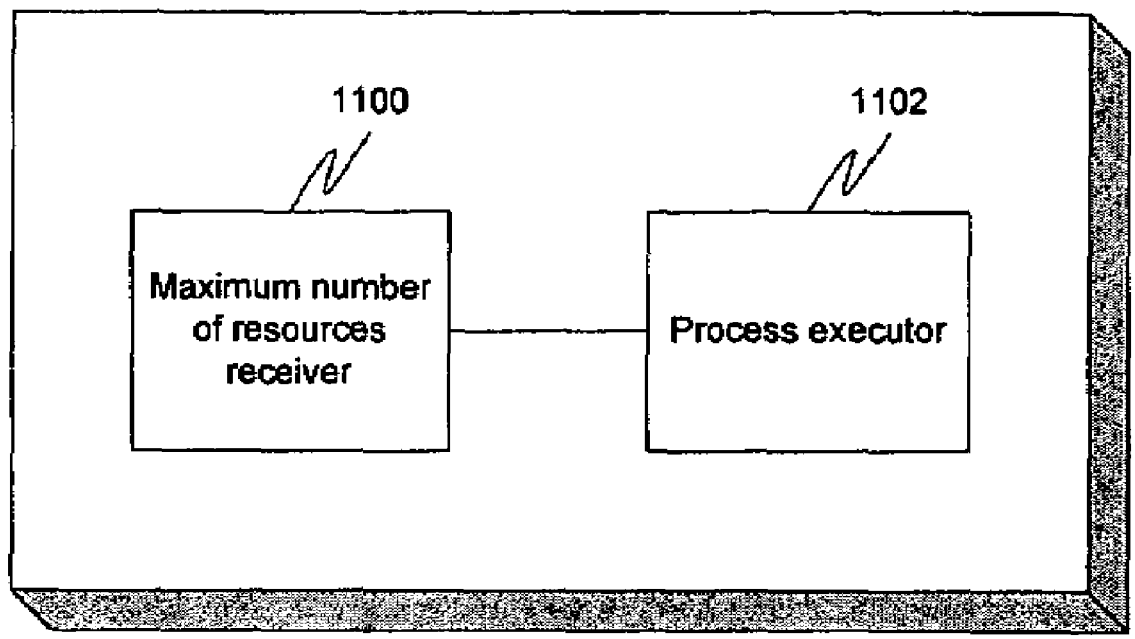
FIG. 11 is a block diagram illustrating an apparatus for optimizing resource utilized in a compiling a computer program in accordance with another embodiment of the present invention.

FIG. 11 is a block diagram illustrating an apparatus for optimizing resource utilized in a compiling a computer program in accordance with another embodiment of the present invention. A maximum number of resources receiver 1100 may receive a maximum number of resources to allocate from a user. A process executor 1102 coupled to the maximum number of resources receiver may execute at least one process to compile the computer program. For each process, the execution may be delayed if the maximum number of resources to allocate has been exceeded by a number of active processes. The maximum number of resources to allocate may be dynamically adjusted if the resources are overloaded. Dynamically adjusting may comprise, for example, lowering the maximum number of resources by a function of the number of active processes divided by the number of resources. It may also comprise, for example, setting the maximum number of resources equal to the maximum of either one or a value equal to the maximum number of resources to allocate indicated by the user minus a function of the number of active processes divided by the number of resources. The resources-may be considered overloaded if, for example, the number of active processes exceeds the number of active resources, exceeds it by at least 200%, or exceeds it by at least 300%. The process may then be executed.

Figure 12:
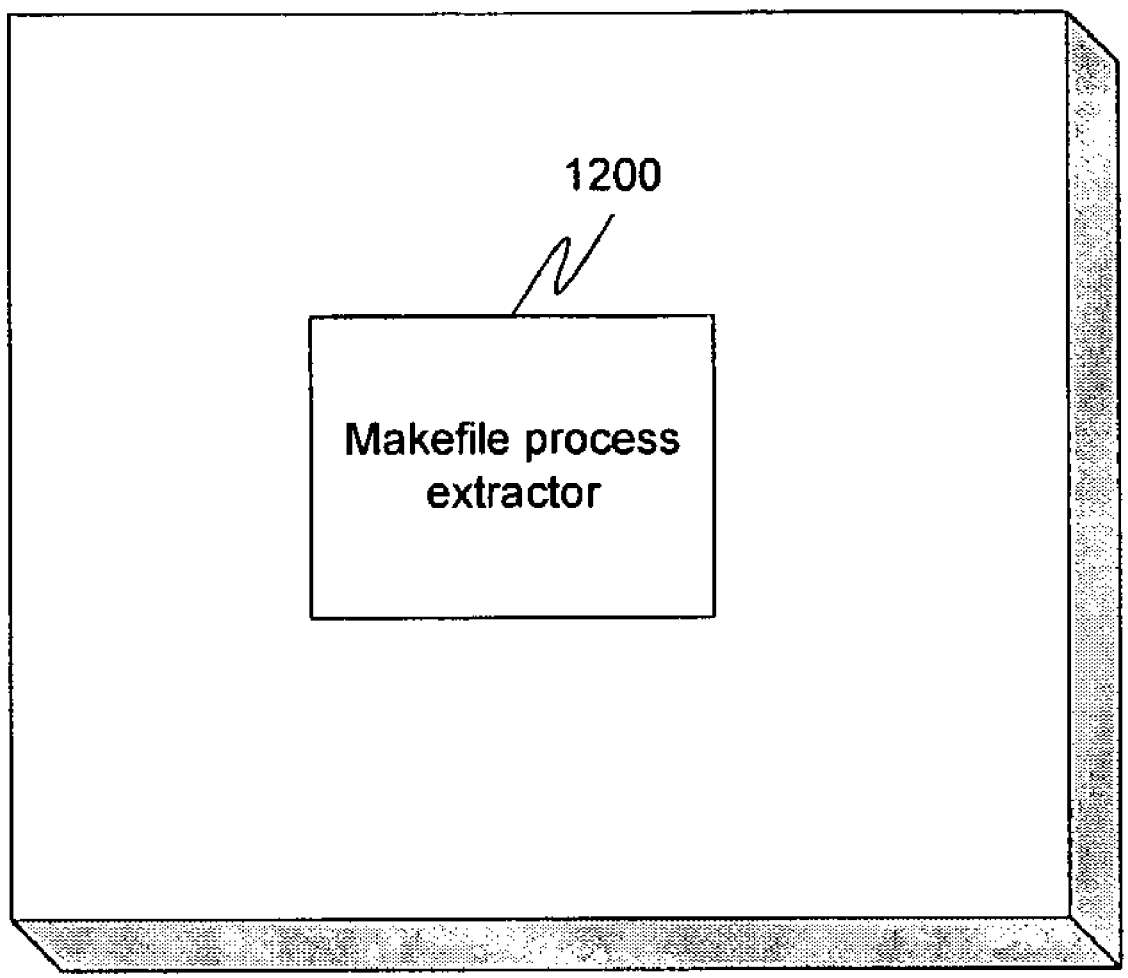
FIG. 12 is a block diagram illustrating an apparatus for executing a distributed make command having a maximum number of resources to allocate as a parameter in accordance with an of the present invention.

FIG. 12 is a block diagram illustrating an apparatus for executing a distributed make command having a maximum number of resources to allocate as a parameter in accordance with an of the present invention. A makefile process extractor 1200 may execute at least one process specified in a makefile to compile the computer program. For each process, the execution may be delayed if the maximum number of resources to allocate has been exceeded by a number of active processes. The maximum number of resources to allocate may be dynamically adjusted if the resources are overloaded. Dynamically adjusting may comprise, for example, lowering the maximum number of resources by a function of the number of active processes divided by the number of resources. It may also comprise, for example, setting the maximum number of resources equal to the maximum of either one or a value equal to the maximum number of resources to allocate indicated by the user minus a function of the number of active processes divided by the number of resources. The resources may be considered overloaded if, for example, the number of active processes exceeds the number of active resources, exceeds it by at least 200%, or exceeds it by at least 300%. The process may then be executed.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method for optimizing resources utilized in compiling a computer program, the method comprising:
   receiving a maximum number of resources to allocate from a user;
   compiling the computer program using said maximum number of resources to allocate indicated by said user; and
   dynamically adjusting said maximum number of resources to allocate during said compiling if said resources are overloaded, wherein said dynamically adjusting comprises lowering said maximum number of resources by a function of the number of active processes divided by the number of resources;
   else utilizing said maximum number of resources for said compiling.

2. The method of claim 1, wherein said resources are overloaded if the number of active processes exceeds the number of resources.

3. The method of claim 1, wherein said resources are overloaded if the number of active processes exceeds the number of resources by 200% or more.

4. The method of claim 1, wherein said resources are overloaded if the number of active processes exceeds the number of resources by 300% or more.

5. The method of claim 1, wherein said dynamically adjusting includes setting said maximum number of resources equal to the maximum of either one or a value equal to the maximum number of resources to allocate indicated by said user minus a function of the number of active processes divided by the number of resources.

6. A method for optimizing resource utilized in compiling a computer program, the method comprising:
   receiving a maximum number of resources to allocate from a user;
   executing at least one process to compile said computer program, said executing further including for each process:
      delaying executing said process if said maximum number of resources to allocate has been exceeded by a number of active processes;
      dynamically adjusting said maximum number of resources to allocate if said resources are overloaded, wherein said dynamically adjusting comprises lowering said maximum number of resources by a function of the number of active processes divided by the number of resources;
   else utilizing said maximum number of resources for executing said process.

7. The method of claim 6, wherein said resources are overloaded if the number of active processes exceeds the number of resources.

8. The method of claim 6, wherein said resources are overloaded if the number of active processes exceeds the number of resources by 200% or more.

9. The method of claim 6, wherein said resources are overloaded if the number of active processes exceeds the number of resources by 300% or more.

10. The method of claim 6, wherein said dynamically adjusting includes setting said maximum number of resources equal to the maximum of either one or a value equal to the maximum number of resources to allocate indicated by said user minus a function of the number of active processes divided by the number of resources.

11. A method for executing a distributed make command having a maximum number of resources to allocate as a parameter, the method comprising:
   executing at least one process specified in a make file to compile said computer program, said executing further including for each process:
      delaying executing said process if said maximum number of resources to allocate has been exceeded by a number of active processes;
      dynamically adjusting said maximum number of resources to allocate if said resources are overloaded, wherein said dynamically adjusting comprises lowering said maximum number of resources by a function of the number of active processes divided by the number of resources;
   else utilizing said maximum number of resources for executing said process.

12. The method of claim 11, wherein said resources are overloaded if the number of active processes exceeds the number of resources.

13. The method of claim 11, wherein said resources are overloaded if the number of active processes exceeds the number of resources by 200% or more.

14. The method of claim 11, wherein said resources are overloaded if the number of active processes exceeds the number of resources by 300% or more.

15. The method of claim 11, wherein said dynamically adjusting includes setting said maximum number of resources equal to the maximum of either one or a value equal to the maximum number of resources to allocate indicated by said user minus a function of the number of active processes divided by the number of resources.

16. An apparatus for optimizing resources utilized in compiling a computer program, the apparatus comprising:
   at least one processor and memory;
   a maximum number of resources receiver;
      a computer program compiler coupled to said maximum number of resources receiver executing on said at least one processor and memory; and
   a maximum number of resources dynamic adjuster coupled to said computer program compiler wherein said resources dynamic adjuster dynamically adjusts said maximum number of resources to allocate during said compiling if said resources are overloaded, wherein said dynamically adjusting comprises lowering said maximum number of resources by a function of the number of active processes divided by the number of resources;
   else utilizing said maximum number of resources for said compiling.

17. An apparatus for optimizing resources utilized in compiling a computer program, the apparatus comprising:
   means for receiving a maximum number of resources to allocate from a user;
   means for compiling the computer program using said maximum number of resources to allocate indicated by said user; and
   means for dynamically adjusting said maximum number of resources to allocate during said compiling if said resources are overloaded, wherein said dynamically adjusting comprises lowering said maximum number of resources by a function of the number of active processes divided by the number of resources;
   else utilizing said maximum number of resources for said compiling.

18. The apparatus of claim 17, wherein said resources are overloaded if the number of active processes exceeds the number of resources.

19. The apparatus of claim 17, wherein said resources are overloaded if the number of active processes exceeds the number of resources by 200% or more.

20. The apparatus of claim 17, wherein said resources are overloaded if the number of active processes exceeds the number of resources by 300% or more.

21. The apparatus of claim 17, wherein said means for dynamically adjusting includes means for setting said maximum number of resources equal to the maximum of either one or a value equal to the maximum number of resources to allocate indicated by said user minus a function of the number of active processes divided by the number of resources.

22. An apparatus for optimizing resource utilized in compiling a computer program, the apparatus comprising:
   means for receiving a maximum number of resources to allocate from a user;
   means for executing at least one process to compile said computer program, said means for executing further including for each process:
      means for delaying executing said process if said maximum number of resources to allocate has been exceeded by a number of active processes;
      means for dynamically adjusting said maximum number of resources to allocate if said resources are overloaded, wherein said means for dynamically adjusting comprises lowering said maximum number of resources by a function of the number of active processes divided by the number of resources;

else utilizing said maximum number of resources for said compiling;

and means for executing said process.

23. The apparatus of claim 22, wherein said resources are overloaded if the number of active processes exceeds the number of resources.

24. The apparatus of claim 22, wherein said resources are overloaded if the number of active processes exceeds the number of resources by 200% or more.

25. The apparatus of claim 22, wherein said resources are overloaded if the number of active processes exceeds the number of resources by 300% or more.

26. The apparatus of claim 22, wherein said means for dynamically adjusting includes means for setting said maximum number of resources equal to the maximum of either one or a value equal to the maximum number of resources to allocate indicated by said user minus a function of the number of active processes divided by the number of resources.

27. A program storage device readable by a machine, tangibly embodying a program of instructions executable by the machine to perform a method for optimizing resources utilized in compiling a computer program, the method comprising:

receiving a maximum number of resources to allocate from a user;

compiling the computer program using said maximum number of resources to allocate indicated by said user; and dynamically adjusting said maximum number of resources to allocate during said compiling if said resources are overloaded, wherein said dynamically adjusting comprises lowering said maximum number of resources by a function of the number of active processes divided by the number of resources;

else utilizing said maximum number of resources for said compiling.

28. A program storage device readable by a machine, tangibly embodying a program of instructions executable by the machine to perform a method for optimizing resource utilized in compiling a computer program, the method comprising:

receiving a maximum number of resources to allocate from a user;

executing at least one process to compile said computer program, said executing further including for each process:

delaying executing said process if said maximum number of resources to allocate has been exceeded by a number of active processes;

dynamically adjusting said maximum number of resources to allocate if said resources are overloaded, wherein said dynamically adjusting comprises lowering said maximum number of resources by a function of the number of active processes divided by the number of resources;

else utilizing said maximum number of resources for executing said process.

29. A program storage device readable by a machine, tangibly embodying a program of instructions executable by the machine to perform a method for executing a distributed make command having a maximum number of resources to allocate as a parameter, the method comprising:

executing at least one process specified in a make file to compile said computer program, said executing further including for each process:

delaying executing said process if said maximum number of resources to allocate has been exceeded by a number of active processes;

dynamically adjusting said maximum number of resources to allocate if said resources are overloaded, wherein said dynamically adjusting comprises lowering said maximum number of resources by a function of the number of active processes divided by the number of resources;

else utilizing said maximum number of resources for executing said process.

* * * * *